United States Patent

[11] 3,541,993

| | | |
|---|---|---|
| [72] | Inventor | Johannes Bruinsma<br>Steensel, Netherlands |
| [21] | Appl. No. | 783,683 |
| [22] | Filed | Dec. 13, 1968 |
| [45] | Patented | Nov. 24, 1970 |
| [73] | Assignee | N. V. Crimex<br>Westerhoven, Netherlands |
| [32] | Priority | Dec. 14, 1967 |
| [33] | | Netherlands |
| [31] | | No. 6717004 |

[54] APPARATUS FOR TREATING EGGS
10 Claims, 4 Drawing Figs.

[52] U.S. Cl. .................................................. 119/1
[51] Int. Cl. ............................................. A01k 45/00
[50] Field of Search ........................................ 119/1

[56] References Cited
UNITED STATES PATENTS

| 3,120,834 | 2/1964 | Goldhaft et al. ............ | 119/1 |
| 3,123,045 | 3/1964 | Cosgrove et al. ............ | 119/1 |
| 3,148,649 | 9/1964 | Moore et al. ................ | 119/1 |
| 3,256,856 | 6/1966 | Nicely et al. ................ | 119/1 |

*Primary Examiner*—Aldrich F. Medbery
*Attorney*—Edmund M. Jaskiewicz

ABSTRACT: An apparatus is disclosed for treating eggs according to the direct pressure difference method wherein a negative pressure is established in the interior of the eggs by subjecting the eggs to a vacuum, a liquid containing an adjuvant penetrates through the impact shells of the eggs when the eggs are again subjected to atmospheric pressure. A plurality of vacuum tanks are circularly arranged on a frame which is rotated about a vertical axis with each tank containing a treatment liquid and a plurality of vertically arranged trays holding eggs. Means are provided for introducing a vacuum or atmospheric pressure into each tank as the frame rotates one revolution.

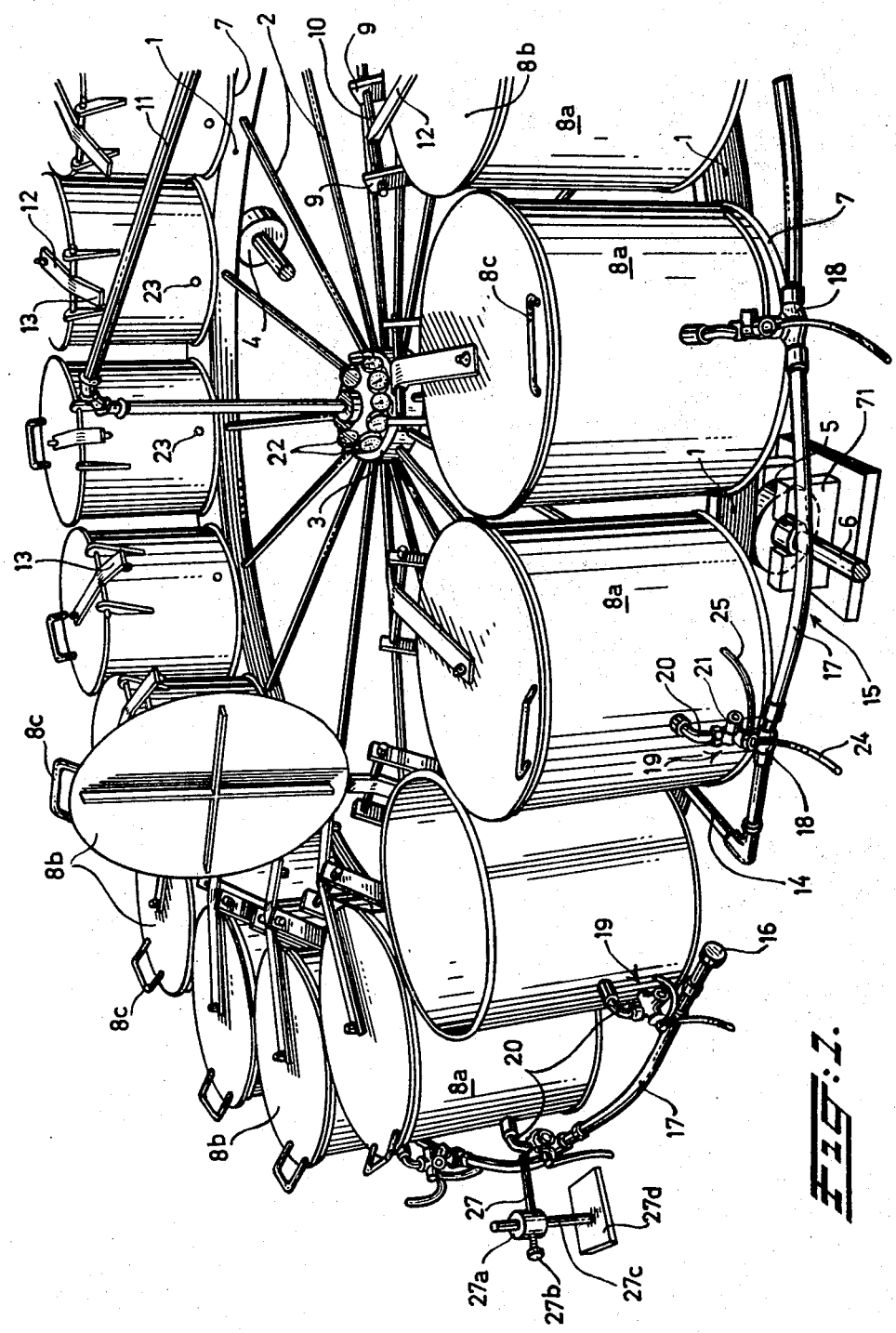

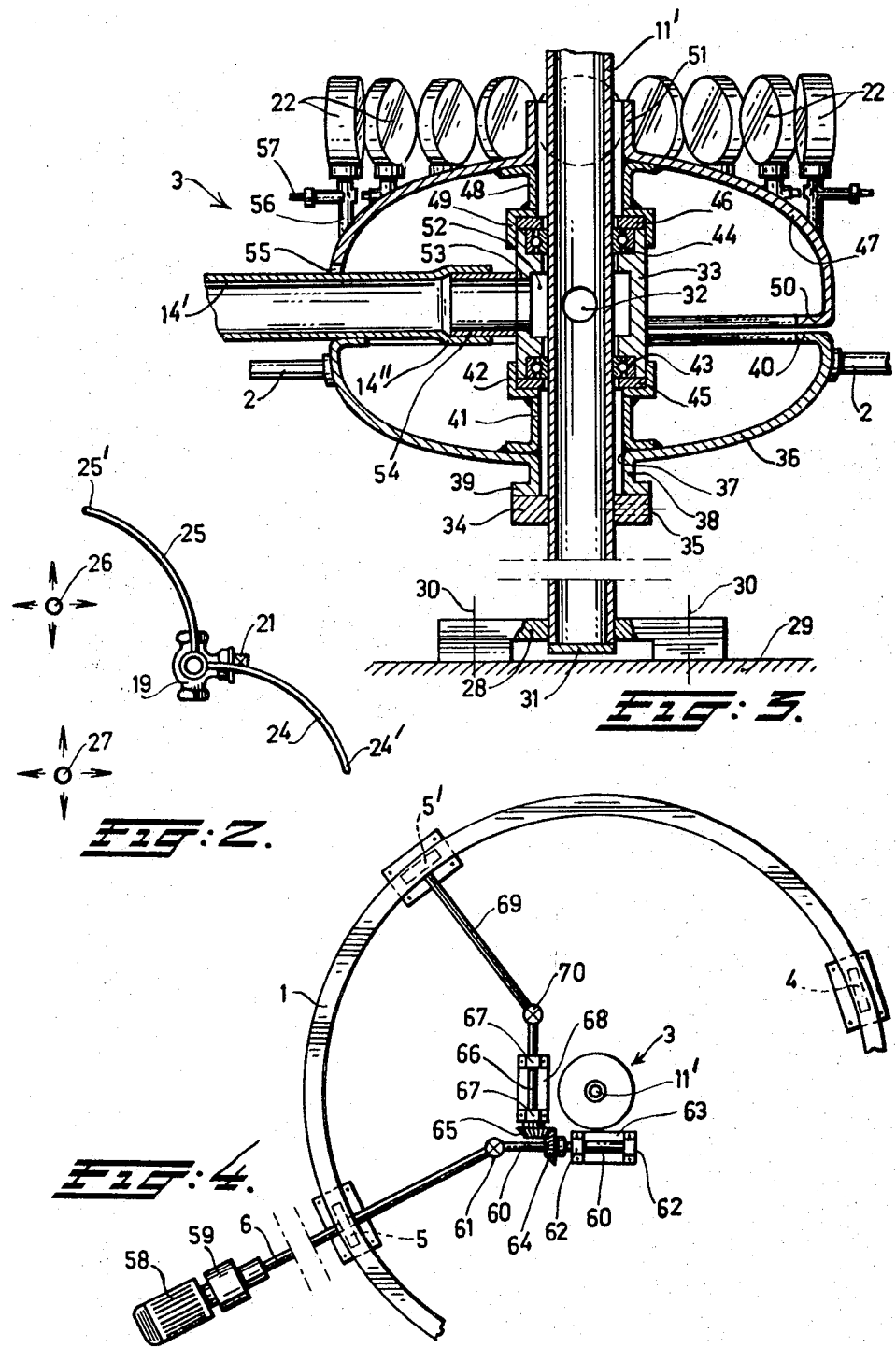

APPARATUS FOR TREATING EGGS

The present invention relates to an apparatus for treating eggs, more particularly, to an apparatus for introducing liquids containing small quantities of adjuvants such as antibiotics, fungicides and similar materials within the intact shell of an egg.

In the poultry field it has long been desired to supply the interiors of intact eggs with various adjuvant substances. One such method involved the use of a hypodermic needle wherein the needle was impierced through the shell and the liquid discharged therein. The hole formed by the needle was then patched by wax or the like.

Various forms of apparatus were then devised for carrying out what has been called the direct pressure method of introducing adjuvants into eggs. Such an apparatus generally comprised a container having a sealing lid and containing treatment liquid with a supporting structure being immersed within the liquid to hold the eggs. The container was connected to a source of vacuum to create a negative or subatmospheric pressure above the liquid within the tank. The vacuum connection was then shut off and atmospheric pressure was again admitted into the tank so that a small amount of liquid containing the adjuvant penetrated through the shell into the interior of the egg under the influence of the negative pressure created within the egg as a result of drawing out the air through the shell while the egg was subjected to the vacuum. Known forms of such apparatus had a limited capacity since only one batch of eggs could be treated at a time.

It is the principal object of the present invention to provide a novel and improved apparatus for the direct pressure treatment of eggs which has increased capacity, is of simple construction and is easy to operate.

A further object of the present invention is to provide a novel and improved method for the introducing of liquids containing adjuvants into the shells of eggs.

In one form of the invention the apparatus for treating eggs may comprise a frame rotatable about a vertical axis with a plurality of vacuum tanks being circularly arranged on the frame. Each tank is provided with a sealing lid and has means therein for holding the eggs immersed in a treatment liquid contained within the tank. Said tanks are connected to a source of vacuum by means including a rotary coupling at the rotary axis of the frame. The frame is rotated about its axis by a driving means connected thereto. On the tanks there are provided means for shutting off the vacuum connection to the tanks after a predetermined time interval and for admitting atmospheric pressure to the tanks so that treatment liquid penetrates into the eggs under the influence of the negative pressure established therein by the sucking of the air through the pores of the egg shell while the tank is connected to the vacuum source.

Other objects and advantages of the present invention will be apparent from the accompanying description when taken in conjunction with the following drawings wherein;

FIG. 1 is an overall perspective view of the apparatus according to the present invention with several of the tanks not being shown;

FIG. 2 is a front elevational view in enlarged scale of the operating valve on each tank and showing the actuating rods;

FIG. 3 is a vertical sectional view taken through the vertical rotary axis of the apparatus; and FIG. 4 is a top plan view of a portion of the circular frame with the tanks being omitted to show the driving connections to the rollers supporting the frame.

Proceeding next to the drawings wherein like reference symbols indicate the same parts throughout the various views a specific embodiment of the present invention will be described in detail.

As may be seen in FIG. 1 the apparatus comprises a frame consisting of an annular member 1 which is connected by a plurality of radial rods 2 to a lower half 36 of a rotary coupling 3. The annular member 1 is supported by a plurality of freely rotatable rollers 4 and rotated by means of a driving roller 5 connected by a driving shaft 6 to an electric motor 58 and a reduction gear box 59 as shown in FIG. 4.

The mechanism for rotating the ring 1 is shown in FIG. 4 and the rotary coupling 3 is shown in FIG. 3, both of which will be described in further detail.

The ring 1 has mounted thereon a number of supporting plates 7 which are annularly arranged and extend along the entire circumference of the ring. In the present embodiment of the invention there are eighteen of such supporting plates. On each of the supporting plates there is mounted a vessel or vacuum tank 8a in which the treatment of the eggs is to be carried out. Each vessel may be made of metal and is provided with an inner vessel or liquid container which may be made of metal or polyvinyl chloride. The eggs which are to be treated are retained in a number of vertically arranged trays which are positioned within the inner container. Such trays are known in the art and the criterion is that such trays hold the largest number of eggs within a tank.

On an inner portion of the outer face of a tank 8a there is mounted a spaced pair of upwardly and outwardly inclined supports 9 between which there is mounted a hinge pin 10 located substantially in the plane of lid 8b of the respective tank but spaced therefrom as may be seen in FIG. 1. An elongated strip 12 may be fastened to the upper face of the lid 8b by a bolt or by welding and is pivotally connected to the pin 10. A rear portion of the strip projects outwardly beyond the vessel indicated at 13 so as to abut against the wall of the vessel when the lid is in the open position. The strip thus defines the extreme open position of the lid as shown in FIG. 1. Each lid 8b is provided with a handle 8c.

A central vacuum conduit 11 has one end connected to a vacuum source such as a pump not shown and communicates through the rotary coupling 3 with a radial conduit 14 which extends outwardly from the coupling toward the vacuum tanks to communicate with an annular conduit 15 positioned outside of the arrangement of tanks. The radial conduit 14 communicates with one end of annular conduit 15 with the other end being closed at 16. The annular conduit comprises a plurality of tubular members 17 between successive tanks 8a and interconnected by tees 18 with there being one tee for each tank.

Each tee 18 is connected with the interior of its respective tank through a three-way valve 19 and a short interconnecting tube 20. The third connection of the three-way valve 19 is indicated at 21 and is open to the atmosphere.

Mounted on a rotary portion of the coupling 3 are a number of vacuum gages 22 corresponding in plurality to the number of tanks 8a and connected therewith so as to indicate at any time the vacuum within a tank. These gages are connected to openings 23 as shown in FIG. 1. The connections themselves are not illustrated so as to not overload the drawing.

Each valve 19 is provided with two actuating rods or fingers 24 and 25 shown in greater detail in FIG. 2. At the axis of the valve, the fingers 24 and 25 are perpendicular to each other but are curved as they extend outwardly with finger 24 being curved in a clockwise direction and finger 25 curved in a counterclockwise direction. The fingers 24 and 25 are actuated by two actuating pins 26 and 27 which are schematically shown in FIG. 2 and are positioned along the circumference of the apparatus. The pin 27 is illustrated in FIG. 2 just to the left of the tank having the open lid. This tank is in the loading position wherein the eggs are placed within the tank.

The actuating pin 27 extends horizontally from a hub or ring 27a which can be adjusted in vertical position by an adjusting screw 27b upon a vertical standard 27c fixed to the floor of the room by a support plate 27d located at the desired distance from the loading station of the eggs in the direction of rotation of the tanks.

The pin 27 has the function of automatically supplying a vacuum in the interior of a vessel after it has been loaded with eggs. A similar vertically adjustable actuating pin 26 is mounted in a like manner on the floor behind the apparatus as shown in FIG. 1 to automatically actuate each valve 19 to shut off the vacuum connection and to open the valve and thus the interior of the tank to atmospheric pressure.

The actuation of the valve 19 as its actuating rods are engaged by pins 26 and 27 will be apparent from FIG. 2. The valve 19 which is mounted on a tank moves to the left as shown in FIG. 2 with respect to the stationary pins 26 and 27. As the actuating rod 25 engages pin 26 the valve will be slowly turned in the clockwise direction through an angle of about 90° at which point the extreme end 25' of the actuating rod will pass below pin 26. In this position atmospheric air will enter through valve connection 21 into the tank. This position of valve 19 is illustrated in the four front tanks of the apparatus illustrated in FIG. 1.

The pin 27 which is positioned below valve 19 functions in a similar manner to actuate rod 24 to return the valve to the position shown in FIG. 2 in which the tank is connected to a source of vacuum. This position of the valve is shown in FIG. 1 in the valve at the extreme left just past actuating pin 27. The arrows radiating from each of the pins 26 and 27 in FIG. 2 indicate the adjustability of the pins. Vertical adjustment of the pins is desirable to establish the correct angular displacement of the actuating rods of the valves. Horizontal adjustment of the pins which is carried out by mounting the pins at different locations on the floor has the function of admitting vacuum and atmospheric pressure to the tanks at desired stages of a complete revolution of the frame and at the desired time intervals.

In FIG. 3, the rotary coupling indicated generally at 3 shows a vertical portion 11' of the central vacuum supply conduit 11. This vertical portion 11' is fixed at its extreme lower end upon a mounting plate 28 secured to the floor 29 by known fastening elements such as bolts schematically indicated at 30. The lower end of the conduit portion 11' is closed by a closure plate 31.

The conduit portion 11' is provided with at least one radial bore 32 within a hub 33 so as to communicate with the inner end 14' of the radial vacuum conduit 14 communicating to the tanks.

A lower support ring 34 is clamped in position onto the tube portion 11' by a set screw 35. This ring 34 supports the lower portion 36 of a rotary coupling which is provided with an opening 37 greater in diameter than the tubular portion 11'. A short tubular extension 38 extends downwardly from the opening 37 and is provided with an external flange 39 which rests upon the ring 34. The contacting faces of flange 39 and ring 34 are adapted to move with respect to each other.

The lower rotary coupling portion 36 has a substantially circular horizontal cross section and the radial rods 2 are connected to this portion by welding. The upper edge 40 of the lower portion 36 is bent radially inwardly.

An annular member 41 having a substantially L-shaped cross section and an inner diameter substantially equal to the diameter of the opening 37 is welded to the interior of the coupling portion 36. The ring member 41 supports a second ring 42 which forms an annular seat around the tubular portion 11' to receive hub 33. The hub 33 is provided with upper and lower annular recesses to accommodate antifriction ball bearings 43 and 44 to permit rotation of the hub with respect to the tubular portion 11'. Sealing rings 45 and 46 close both ends of hub 33 so as to prevent atmospheric air from entering into the hub.

The rotary coupling 3 has an upper portion 47 which is mounted upon the hub 33 by means of a ring member 48 having an L-shaped cross section and a second ring 49 which forms a reverse annular seat for receiving the upper end of hub 33 and its sealing ring 46. The upper portion 47 also has its circumferential edge 50 bent inwardly so as to face the bent edge 40 of the lower portion 36. The upper portion 47 is provided with an upwardly extending tubular extension 51 whose inner diameter is greater than the diameter of the tubular portion 11'.

Within hub 33 between bearings 43 and 44 there is an annular chamber 52 which communicates with the vacuum supply tube 11' through the bore 32. The hub 33 is also provided with a radial bore 53 from which extends a tubular portion 54 upon which is fitted a flared end 14'' of the radial vacuum conduit 14' to provide a closed connection. The radial conduit 14' enters into the coupling 3 through an opening 54 in the upper coupling portion 47.

As may be seen in FIG. 3, the vacuum gages 42 are mounted on the upper coupling portion 47 by studs 56 from which extend tubular conduits 57 for connection to the respective tanks.

It is apparent that in the coupling structure the assembly of the hub 33, coupling portions 36 and 47, tube 14', radial rods 2 and the ring 1 to which the rods 2 are connected rotates about the fixed tubular portion 11' which is connected to a source of vacuum.

The arrangement for driving the frame and the ring member 1 is illustrated in FIG. 4. The electric motor 58 and the reduction gear 59 which drives shaft 6 may be arranged outside of the ring 1 so that the shaft passes below the ring to the space in the interior of the ring. It is not necessary that the shaft 6 extend radially with respect to the ring member 1. The inner end of shaft 6 is connected with a short shaft 60 by a universal joint coupling 61. Shaft 60 rotates in a pair of bearing blocks 62 on a support plate 63 fastened to the floor in the vicinity of the rotary coupling 3. Shaft 60 has a bevel gear 64 meshing with a second bevel gear 65 on the end of a drive shaft 66. Shaft 66 extends perpendicularly to the shaft 60 and is supported in a similar manner in a pair of bearing blocks 67 upon a mounting plate 68 fastened upon the floor. The other end of shaft 66 drives a fourth shaft 69 through a universal coupling 70. The shaft 69 extends radially outwardly toward ring member 1 and has mounted on its outer end a driving roller 5' positioned below the ring 1 and supported in a bearing block in a manner similar to the first driving roller 5 on shaft 6. A bearing block, indicated at 71 and shown in FIG. 1 is provided with two semicircular bearing faces on both sides of the roller to support the shaft.

The freely rotatably rollers 4 may be similarly journaled but since these rollers are not driven their shafts are relatively short.

The total number of rollers under ring 1 will be at least three and at least one roller is driven by the electric motor. Preferably two rollers such as 5 and 5' are driven and preferably the total number of rollers is greater than three, for example five or even six rollers. All of the rollers will be freely rotatable such as the roller 4 with the rollers being equidistantly spaced along the circumference of ring 1 so that the entire frame is uniformly supported.

The apparatus of the present invention will operate in the following manner:

After opening lid 8b of a tank 8c at the station where the eggs to be treated are loaded after arriving at the station from a conveyor at the exit end of an egg washing machine, the tank is filled with eggs and sufficient liquid containing an inoculating agent or other adjuvant so that all of the eggs are immersed. Above the surface of the liquid there a space below the lid. The lid 8b which is provided with suitable sealing rings or the like so as to provide a hermetic sealing of the tank is closed. The valve 19 of this tank will b then be actuated by the first pin 27 so that a vacuum is admitted into the tank in the space above the liquid. The entire apparatus slowly rotates so that after the above described operation has been carried out the next tank will arrive at the loading station. This tank and subsequently arriving tanks are similarly filled with the eggs to be treated.

Because of the vacuum connection to a tank a negative pressure is established in the tank above the liquid which may be 0.4 kilograms per $cm^2$. As a result of this negative pressure a portion of the air which is always present in the eggs will be drawn out through the porous eggshell. The rotary speed of the apparatus and the locations of the actuating pins 27 and 26 are so selected that the eggs will remain under vacuum for 4 to 10 minutes. When the valve 19 is actuated by the next pin, atmospheric pressure is admitted gradually into the tank space above the liquid. As a result of the air extracted from the egg during the vacuum period there will be a negative pressure in the egg which will cause a small amount of liquid to penetrate through the pores of the eggshell. The eggs may be subjected to this atmospheric pressure for preferably 8 minutes or more.

It is therefore apparent that the inoculation or other treatment of the eggs has been performed without any risk of contamination as opposed to the conventional method wherein liquid is introduced into an egg through an injection needle.

In the direct pressure difference method as previously carried out the duration of applying the vacuum was generally between 20 seconds and about 2 minutes. It has been discovered that by utilizing a vacuum period of between 4 and 10 minutes more liquid will be taken up by the eggs and the liquid in all of the eggs treated will be more nearly equal. It is believed that this results in obtaining improved hatchability and/or livability.

The rotary speed of the apparatus is such that during the total duration of the vacuum treatment and subjecting the eggs to atmospheric pressure the apparatus rotates one complete revolution. As a result, when the trays containing the treated eggs are removed from a tank containers containing eggs to be treated may be placed into the emptied tank. It may then be necessary to only periodically supply treatment liquid to the tank to maintain the level of the liquid in each tank sufficient to immerse all of the eggs positioned therein.

Since liquid passes through the pores of the eggshells more slowly than gases, it is preferable to make the period of atmospheric pressure about twice the duration of the vacuum period. Since these values are about 10 minutes and 5 minutes respectively, the total duration of one revolution of the apparatus will be about 15 minutes.

In addition tot the previously described advantage of the present invention wherein the contamination of eggs is prevented, the present apparatus has the advantage that the productivity of operating personnel is significantly increased. With the present apparatus one man can treat 10,000 chicken eggs per hour. Further, the present apparatus if efficient in operation and simple in structure. If so desired, the same apparatus with the same structural components could be slightly modified so as to rotate in a vertical plane.

It will be understood that this invention is subject to modification in order to adapt it to different uses and conditions and, accordingly, it is desired to comprehend such modification within this invention as may fall within the scope of the appended claims.

I claim:

1. In an apparatus for treating eggs, the combination of a frame rotatable about a vertical axis, a plurality of vacuum tanks circularly arranged on said frame, said tanks each having a sealing lid and means therein for holding eggs immersed in a treatment liquid contained in the tank, means including a rotary coupling at the rotary axis of the frame for connecting a source of vacuum to said tanks, means operatively connected to said frame for driving said frame about its rotary axis, and means on said tanks for shutting off the vacuum connection to the tanks after a predetermined time interval and for admitting atmospheric pressure to the tanks whereby treatment liquid penetrates into the eggs under the influence of the below-atmospheric pressure established therein by the drawing of the air through the pores of the eggshell while the tank is connected to the vacuum source.

2. In an apparatus as claimed in claim 1 with said vacuum connecting means comprising a conduit extending radially from said rotary coupling toward said tanks, an annular conduit adjacent said circularly arranged tanks and connected to said radial conduit, and a three-way valve connected between each tank and said annular conduit with the third connection opening to the atmosphere whereby each valve can admit one of a vacuum and atmospheric pressure to a tank.

3. In an apparatus as claimed in claim 2 with each valve having curved actuating rods projecting therefrom, and a plurality of actuating members positioned adjacent said tanks and engagable by said actuating rods as the frame rotates whereby each tank is connected to the vacuum and then to the atmosphere.

4. In an apparatus as claimed in claim 1 with said frame comprising an annular member and a plurality of radial rods extending from said annular member to said rotary coupling, a plurality of rollers supporting said annular member, said driving means being connected to one of said rollers and the other rollers being freely rotatable.

5. In an apparatus as claimed in claim 1 and comprising a tubular member positioned at the rotary axis of said frame and connected to the source of vacuum, said tubular member having a radial bore therein and the lower end of said tubular member being closed, a hub having a sealed annular chamber therein rotatable about said tubular member with said annular chamber communicating with said radial bore, vacuum conduit means connecting the interior of said hub annular chamber and said tanks, said rotary coupling having a lower portion connected to said hub, and means connecting said lower rotary coupling portion to said frame.

6. In an apparatus as claimed in claim 1 and comprising a vacuum gage connected to each of said tanks.

7. In an apparatus as claimed in claim 1 and comprising a plurality of spaced brackets extending upwardly and outwardly from the outer face of each tank, a pin between said brackets and substantially in the plane of the tank lid, a strip mounted on the tank lid and pivotally connected to said pin, the end of said strip extending outwardly of said pin to abut the outer face of the tank to define the open position of the lid.

8. In an apparatus as claimed in claim 1 and comprising an inner container within each tank for holding the treatment liquid.

9. In an apparatus as claimed in claim 1 and comprising a plurality of vertically arranged trays within said tank for holding eggs.

10. In a method of introducing an adjuvant through the intact shell of an egg immersed in a liquid containing the adjuvant within a closed chamber, the steps of establishing a subatmospheric pressure within the closed chamber above the liquid for 4—10 minutes within which time air is drawn from the interior of the egg, and gradually admitting atmospheric pressure into the space above the liquid with the eggs remaining immersed so that the liquid containing adjuvant penetrates into the eggs under the influence of the subatmospheric pressure within the eggs, the eggs remaining immersed under atmospheric pressure for at least 8 minutes.